(12) United States Patent
Beaurepaire et al.

(10) Patent No.: US 9,279,444 B2
(45) Date of Patent: Mar. 8, 2016

(54) CRANKSHAFT

(75) Inventors: Olivier Beaurepaire, Rumilly (FR); Omar Mian, Rugby (GB)

(73) Assignees: MAHLE International GmbH, Stuttgart (DE); MAHLE Composants Moteur France SAS, Chavanod (FR); MAHLE Engine Systems, Rugby, Warwickshire (GB)

( * ) Notice: Subject to any disclaimer, the term of this patent is extended or adjusted under 35 U.S.C. 154(b) by 195 days.

(21) Appl. No.: 14/001,331

(22) PCT Filed: Feb. 24, 2012

(86) PCT No.: PCT/EP2012/000804
§ 371 (c)(1),
(2), (4) Date: Dec. 6, 2013

(87) PCT Pub. No.: WO2012/113565
PCT Pub. Date: Aug. 30, 2012

(65) Prior Publication Data
US 2014/0096739 A1    Apr. 10, 2014

(30) Foreign Application Priority Data
Feb. 25, 2011    (GB) .................................. 1103262.0

(51) Int. Cl.
*F16C 33/10*    (2006.01)
*F16C 3/14*    (2006.01)

(52) U.S. Cl.
CPC .............. *F16C 3/14* (2013.01); *Y10T 74/2185* (2015.01)

(58) Field of Classification Search
CPC .............. F16C 3/14; F16C 9/02; F16C 9/04; F16C 33/068; F16C 33/085; Y10T 74/2185

USPC .................. 123/197.4, 196; 384/288
See application file for complete search history.

(56) References Cited

U.S. PATENT DOCUMENTS

| | | | | |
|---|---|---|---|---|
| 2,081,157 | A | * | 5/1937 | Swenson ...................... 184/6.5 |
| 3,768,335 | A | * | 10/1973 | Mayer ........................... 74/597 |
| 5,152,373 | A | * | 10/1992 | Callies .......................... 184/6.5 |
| 5,799,547 | A | | 9/1998 | Agarrat |
| 6,491,438 | B1 | * | 12/2002 | Ono et al. .................... 384/288 |

(Continued)

FOREIGN PATENT DOCUMENTS

| EP | 1 557 544 A1 | 7/2005 |
|---|---|---|
| EP | 2 141 371 A2 | 1/2010 |

(Continued)

OTHER PUBLICATIONS

International Search Report of PCT/EP2012/000804, Aug. 17, 2012.

(Continued)

*Primary Examiner* — Marguerite McMahon
(74) *Attorney, Agent, or Firm* — Collard & Roe, P.C.

(57) ABSTRACT

A crankshaft comprising a plurality of main journal bearing surfaces (102), a plurality of connector rod bearing surfaces (104), and at least one oil feed passageway (110) internal to the crankshaft, each of the at least one oil feed passageways (110) communicating with an inlet (122) and a plurality of outlets (124) located within bearing surfaces (102, 104), and wherein the inlet (122) is located within a first main journal bearing surface, and at least one of the outlets (124) is located within a further main journal bearing surface, and an engine and a vehicle comprising such a crankshaft.

18 Claims, 6 Drawing Sheets

(56) References Cited

U.S. PATENT DOCUMENTS

| | | | |
|---|---|---|---|
| 6,857,411 B2 | 2/2005 | Ronneburger et al. | |
| 7,077,096 B2 | 7/2006 | Matsuda | |
| 7,281,854 B2 | 10/2007 | Terada et al. | |
| 7,954,600 B2* | 6/2011 | Ohta | 184/6.5 |
| 8,870,460 B2* | 10/2014 | Lehmann et al. | 384/286 |
| 2004/0069265 A1* | 4/2004 | Pierro | 123/196 R |
| 2005/0196084 A1 | 9/2005 | Kitahara et al. | |
| 2006/0104556 A1 | 5/2006 | Tidwell | |

FOREIGN PATENT DOCUMENTS

| | | |
|---|---|---|
| FR | 2 858 012 A1 | 1/2005 |
| FR | 2 939 854 A1 | 6/2010 |
| GB | 2 350 652 A | 12/2000 |
| JP | 7-27127 A | 1/1995 |
| JP | 2005-282537 A | 10/2005 |
| JP | 2006-125565 A | 5/2006 |
| WO | WO 02/063143 A1 | 8/2002 |

OTHER PUBLICATIONS

British Search Report of British Application No. GB1103262.0, Jun. 8, 2011.
British Search Report of British Application No. GB1103261.2, Jun. 6, 2011.
Written Opinion of the International Search Authority of PCT/EP2012/000804, Feb. 24, 2012.
Written Opinion of the International Search Authority of PCT/EP2012/000806, Feb. 24, 2012.
International Search Report of PCT/EP2012/000806, Jul. 5, 2012.

* cited by examiner

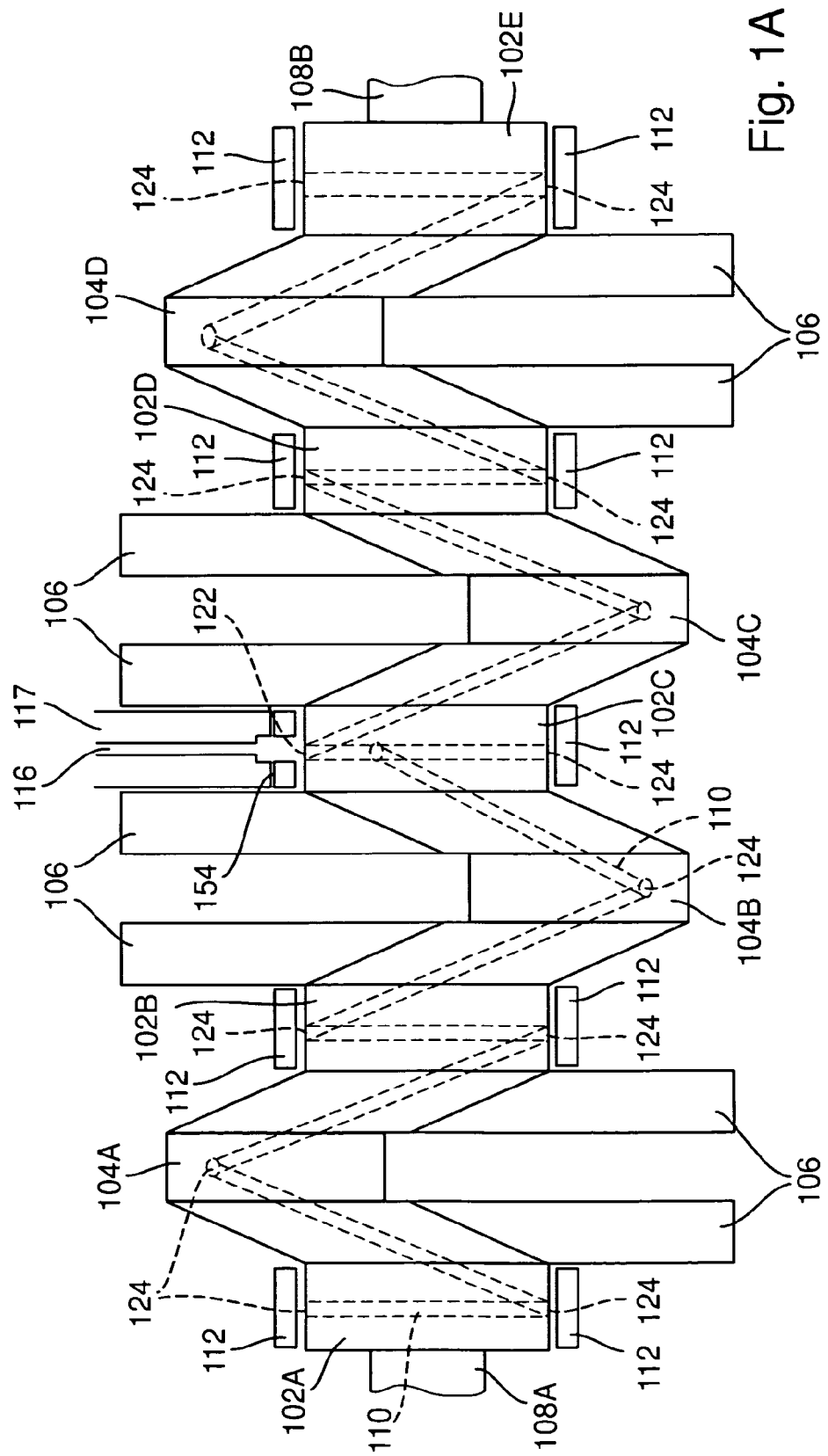

CRANKSHAFT

CROSS REFERENCE TO RELATED APPLICATIONS

This application is the National Stage of PCT/EP2012/000804 filed on Feb. 24, 2012, which claims priority under 35 U.S.C. §119 of Great Britain Application No 1103262.0 filed on Feb. 25, 2011, the disclosures of which are incorporated by reference. The international application under PCT article 21(2) was published in English.

The present invention relates to crankshafts for internal combustion engines, in particular crankshafts having internal passageways for lubrication oil.

BACKGROUND

The provision of lubrication oil to the main journal bearings and connector rod bearings of a crankshaft is critical to the operation of internal combustion engines. As well as lubricating the relative movement of connected components to reduce wear, oil provides an important cooling function.

Known engines incorporate passageways internal to the engine block through which oil is pumped into main journal bearings of the crankshaft, and internal passageways are provided within the crankshaft between main journal bearings and one, or at most two, adjacent connector rod bearings. The oil flow to the crankshaft bearings is firstly supplied to the main journal bearings from an oil gallery of the engine block, and thence from the main journal bearing to an adjacent connector rod bearing (big end bearing). The oil supply to the oil gallery supplying the main bearings is provided by an oil pump in the engine. Typically the oil is supplied to grooved bearing shells situated in the engine block, whilst the corresponding bearing shells situated in the bearing caps are plain, un-grooved bearing shells. The grooved bearing shell halves are each provided with an oil access hole corresponding in position to the oil supply passageway from the oil supply gallery and a groove around the inner periphery to provide oil into the inputs of the crankshaft's internal passageways to the one or more adjacent connector rod bearings. Disadvantageously, oil pumps for pumping oil into the lubrication system are heavy, bulky, and consume a large amount of energy. Further, the grooved bearing shell that is required at each main journal bearing leaks more oil than a plain bearing shell, increasing oil flow and the necessary pumping rate and power consumption of the oil pump.

JP07027127A discloses crankshaft lubrication arrangements in which main journal bearings are fed with oil by oil supply passageways internal to the engine block, and the connector rod bearings are each fed with oil from main journal bearings through internal passageways of the crankshaft.

In a first arrangement of JP07027127A, an internal oil feed passageway leads from each of the main journal bearings on either side of each connector rod bearing to the respective connector rod bearing. One half of each of the main journal bearings has a semi-cylindrical bearing shell with a semi-cylindrical groove into which oil is pumped through an internal passageway of the engine block, and from which oil is fed into an internal passageway to a connector rod bearing. In this arrangement, alternate main journal bearings alternately have such semi-cylindrical grooves provided in their upper and lower semi-cylindrical bearing shells, and oil is fed to each connector rod bearing from the two adjacent main journal bearings during alternating halves of a complete rotation of the crankshaft.

Disadvantageously, this first arrangement requires every main journal bearing to be provided with a semi-cylindrical bearing shell with a semi-cylindrical groove. Such bearing shells are more expensive than plain bearing shells and leak more oil. For example, in the case of a four cylinder engine according to this design, each of the five main journal bearings requires to be provided with such a bearing shell. Such grooved bearing shells may require the provision of several times more oil than a corresponding plain bearing (e.g. five times more oil).

Further, disadvantageously, this first arrangement requires an oil supply passageway to each main journal bearing to be provided in the engine block. The provision of such oil supply passageways in the engine block increases the complexity and manufacturing cost of the engine block. For example, in the case of a four cylinder engine according to this design, having five main journal bearings, five oil supply passageways are required in the engine block.

In a second arrangement of JP07027127A, two internal oil feed passageways lead from alternate main journal bearings to feed oil to the connector rod bearings. One internal passageway leads to each of the connector rod bearings on either side of each of the oil feeding main journal bearings. Again, each of the oil feeding main journal bearings has a semi-cylindrical bearing shell with a semi-cylindrical groove into which oil is pumped through an internal passageways of the engine block. However, both the oil feeding main journal bearings and those main journal bearings that do not feed oil into internal passageways of the crankshaft require to be supplied with oil by oil supply passageways from the oil gallery to provide lubrication.

In this second arrangement, the number of oil feeding main journal bearings is lower than in the first arrangement. However, disadvantageously, in this second arrangement, it is still required that approximately half of the main journal bearings are oil feeding main journal bearings, each of which has a corresponding semi-cylindrical bearing shell with a semi-cylindrical groove. For example, in a four cylinder engine, at least two of the five main journal bearings require to be oil feeding main journal bearings having such a grooved bearing shell, and to be fed through five oil supply passageways in the engine block. In a further example in an engine having six cylinders served by a common crankshaft, at least three of the seven main journal bearings require to be oil feeding main journal bearings having such a grooved bearing shell, and to have seven oil supply passageways.

Further, disadvantageously, this second arrangement still requires an oil supply passageway to be provided in the engine block to each main journal bearing (both the oil feeding main journal bearings and the non-oil feeding main journal bearings). For example, for a four cylinder engine, an oil supply passageway is required for each of the five main journal bearings. Similarly, in an engine having six cylinders served by a common crankshaft, an oil supply passageway is required for each of the seven main journal bearings.

U.S. Pat. No. 7,281,854B2 discloses an engine lubrication arrangement similar to the second arrangement of JP07027127A, described above.

Accordingly, a need remains for a crankshaft for an engine lubrication arrangement having reduced numbers of oil feeding main journal bearings. Further, a need remains for a crankshaft for an engine lubrication arrangement requiring a reduced number of oil supply passageways provided in the engine block.

SUMMARY OF THE DISCLOSURE

According to a first aspect of the present invention, there is provided a crankshaft comprising:

a plurality of main journal bearing surfaces,
a plurality of connector rod bearing surfaces, and
at least one oil feed passageway internal to the crankshaft,
each of the at least one oil feed passageways communicating with an inlet and a plurality of outlets located within bearing surfaces, and
wherein the inlet is located within a first main journal bearing surface, and at least one of the outlets is located within a further main journal bearing surface.

According to a second aspect of the present invention, there is provided a crankshaft arrangement comprising a crankshaft and bearing shells located in correspondence with the main journal bearing surfaces, the crankshaft comprising:
a plurality of main journal bearing surfaces,
a plurality of connector rod bearing surfaces, and
at least one oil feed passageway internal to the crankshaft,
each of the at least one oil feed passageways communicating with an inlet and a plurality of outlets located within bearing surfaces, and
wherein the inlet is located within a first main journal bearing surface, and at least one of the outlets is located within a further main journal bearing surface, and
wherein the engine has an oil supply passageway in correspondence with the or each inlet of the crankshaft.

According to a third aspect of the present invention, there is provided an engine comprising a crankshaft arrangement, an engine block, at least one bearing cap and an oil tray, wherein the bearing housings are comprised within at least one of the engine block, the at least one bearing cap and the oil tray, and wherein the crankshaft arrangement comprises
a crankshaft and bearing shells located in correspondence with the main journal bearing surfaces, the crankshaft comprising:
a plurality of main journal bearing surfaces,
a plurality of connector rod bearing surfaces, and
at least one oil feed passageway internal to the crankshaft,
each of the at least one oil feed passageways communicating with an inlet and a plurality of outlets located within bearing surfaces, and
wherein the inlet is located within a first main journal bearing surface, and at least one of the outlets is located within a further main journal bearing surface, and
wherein the engine has an oil supply passageway in correspondence with the or each inlet of the crankshaft.

According to a fourth aspect of the present invention, there is provided a vehicle comprising an engine comprising a crankshaft arrangement, an engine block, at least one bearing cap and an oil tray, wherein the bearing housings are comprised within the engine block, the at least one bearing cap and the oil tray, and wherein the crankshaft arrangement comprises
a crankshaft and bearing shells located in correspondence with the main journal bearing surfaces, the crankshaft comprising:
a plurality of main journal bearing surfaces,
a plurality of connector rod bearing surfaces, and
at least one oil feed passageway internal to the crankshaft,
each of the at least one oil feed passageways communicating with an inlet and a plurality of outlets located within bearing surfaces, and
wherein the inlet is located within a first main journal bearing surface, and at least one of the outlets is located within a further main journal bearing surface, and
wherein the engine has an oil supply passageway in correspondence with the or each inlet of the crankshaft.

The journal bearing surfaces of the crankshaft are the bearing surfaces of the journal bearings. The crankshaft has main journal bearings and one or more connector rod journal bearings, each of which has a bearing surface.

The provision of an oil feed passageway internal to the crankshaft enables several bearings to be lubricated by oil provided to a single inlet. In particular, an outlet of the oil feed passageway may be provided in the bearing surface of a main journal bearing, such that the main journal bearing can be lubricated by oil fed through the oil feed passageway. Advantageously, the provision of lubrication to the further main journal bearing through the oil feed passageway enables that further main journal bearing to operate without the provision of a separate oil supply passageway to it within the engine block, bearing cap or oil tray. Such an arrangement reduces the complexity and cost of the engine block, bearing cap or oil tray.

Further, an oil feed passageway having an inlet within the bearing surface of a first main journal bearing may provide lubrication to all of the remaining main journal bearings along the path of the oil feed passageway, such that an oil supply passageway of the engine block or cylinder head is only required to that main journal bearing. Such an arrangement further reduces the complexity and cost of the engine block, bearing cap or oil tray.

Advantageously, the bearing lubrication arrangement corresponding to the crankshaft of the present invention may require less oil than existing arrangements, thus enabling the use of smaller and lighter pumps that have a lower maximal pumping rate (by volume). Plain bearing shells may require the provision of several times less oil than a prior art grooved bearing shell, for example each of the extra plain bearing shells may require the provision of only 20% of the oil required by a corresponding grooved bearing shell.

The inlet may be located within a main journal bearing surface proximal an end of the crankshaft. The inlet may be located within a main journal bearing surface substantially centrally located within the plurality of main journal surfaces. The at least one oil feed passageway may comprise a first inlet and a second inlet located within a main journal bearing surface. The first and second inlets may be located in different main journal bearing surfaces.

The at least one oil feed passageway may comprise a first inlet and a second inlet, and wherein the first inlet and second inlet communicate with a common oil feed passageway.

The crankshaft may comprise a first oil feed passageway communicating with a first inlet, and a second oil feed passageway communicating with a second inlet, the first and second oil feed passageways being separate.

The plurality of outlets may be located within a plurality of main journal surfaces.

The oil feed passageway may be configured to supply oil to an outlet in a first, connector rod bearing surface that is connected to the oil feed passageway intermediate an input in the first main journal bearing surface and an output in the second main journal bearing surface.

The oil feed passageway may be configured to supply oil to an outlet in a second, connector rod bearing surface that is connected to the oil feed passageway intermediate the output in the second main journal bearing surface and an output in a third main journal bearing surface.

In some embodiments, the crankshaft is configured such that the at least one oil feed passageway is configured to supply oil from in inlet to outlets distributed along the crankshaft, in series, from the first main journal bearing surface to a first, adjacent, connector rod bearing surface and then to a second main journal bearing surface located beyond the first, adjacent connector rod bearing surface further along the crankshaft. Optionally, the at least one oil feed passageway is configured further to supply oil to a second connector rod bearing surface beyond the second main journal bearing surface, and then to a third main journal bearing surface beyond the second connector rod bearing surface, and so forth.

In these embodiments, the second (and subsequent) main journal bearing surface(s) need not be provided with a direct external oil feed inlet, since sufficient lubricating oil will be supplied by way of the oil feed passageway internal to the crankshaft.

An oil feed passageway may comprise a series of serially arranged sections, each of which sections is terminated at a bearing surface. Alternatively, or additionally, an oil feed passageway may comprise a stem passageway from which one or more branches radiate to bearing surfaces.

In embodiments having first and second oil feed passageways, the first and second oil feed passageways may both terminate at the same main journal bearing surface, this bearing surface thus being lubricated by oil flowing in two generally opposed axial directions along the crankshaft. The oil supply may be sufficient to avoid the need for a separate, external oil supply to the main journal bearing surface in question.

The crankshaft arrangement may have a bearing shell in correspondence with the or each inlet of the crankshaft has an oil supply groove. Advantageously, the oil supplied through the oil supply passageway passes into and flows around within the oil supply groove.

A bearing shell in correspondence with the or each inlet may have an oil supply slot. Advantageously, the oil supplied through the oil supply passageway passes into and flows around within the oil supply slot. Advantageously, the slot may have a larger cross-sectional area than an oil supply groove, providing better supply of oil to the bearing and associated oil feed passageway. Further, the slot may be deeper than an oil supply groove in a bearing shell, and so may provide a comparable cross-sectional area with a narrower slot, thereby reducing the amount of the bearing surface of the bearing shell that is taken up with oil distribution, accordingly reducing wear in the bearing.

An oil supply channel may be provided in a bearing housing that houses the bearing shell having the oil supply slot. Advantageously, the oil supplied through the oil supply passageway passes into and flows around within the oil supply slot of the bearing shell and the corresponding oil supply channel of the bearing housing. Advantageously, the combined slot in the bearing shell and channel in the bearing housing may have a larger cross-sectional area than an oil supply groove or oil supply slot in a bearing shell alone, providing a better supply of oil to the bearing and associated oil feed passageway. Further, the combined slot and channel may be deeper, and so may provide a comparable cross-sectional area by means of a narrower slot, thereby reducing the amount of the bearing surface of the bearing shell that is taken up with oil distribution, accordingly reducing wear in the bearing. The oil supply channel may be deeper (radially with respect to the axis of rotation of the crankshaft) than the thickness of the slotted bearing shell.

Where the oil supply slot in the bearing shell and the oil supply channel in the bearing housing abut, they may be of substantially equal width. The oil supply channel in the bearing housing may be straight-sided.

At least part of the oil supply channel may be wider than the slot in the bearing shell. For example, the oil supply channel in the bearing housing may increase in width away from the bearing shell. Advantageously this may provide a further enhanced supply of oil to the bearing.

The crankshaft arrangement may comprise bearing housings and an oil supply passageway communicating with the inlet is provided within at least one of the bearing housings.

An oil supply passageway may be provided in correspondence with the or each inlet of the crankshaft.

An oil supply passageway may not be provided in correspondence with at least two of the main journal bearings.

The oil supply passageway may be provided in the engine block and/or a bearing cap.

The engine may comprise an oil pump connected to the inlet.

BRIEF DESCRIPTION OF THE DRAWINGS

Embodiments of the invention are further described hereinafter with reference to the accompanying drawings, in which:

FIG. 1A shows a crankshaft according to the present invention;

DETAILED DESCRIPTION

In the described embodiments, like features have been identified with like numerals, albeit in some cases having one or more of: an increment by 100; a suffix letter; and an apostrophe. For example, in different FIGS., 102A, 102B, 102, 102', and 202A have been used to indicate a main journal bearing section.

Figure 1B:
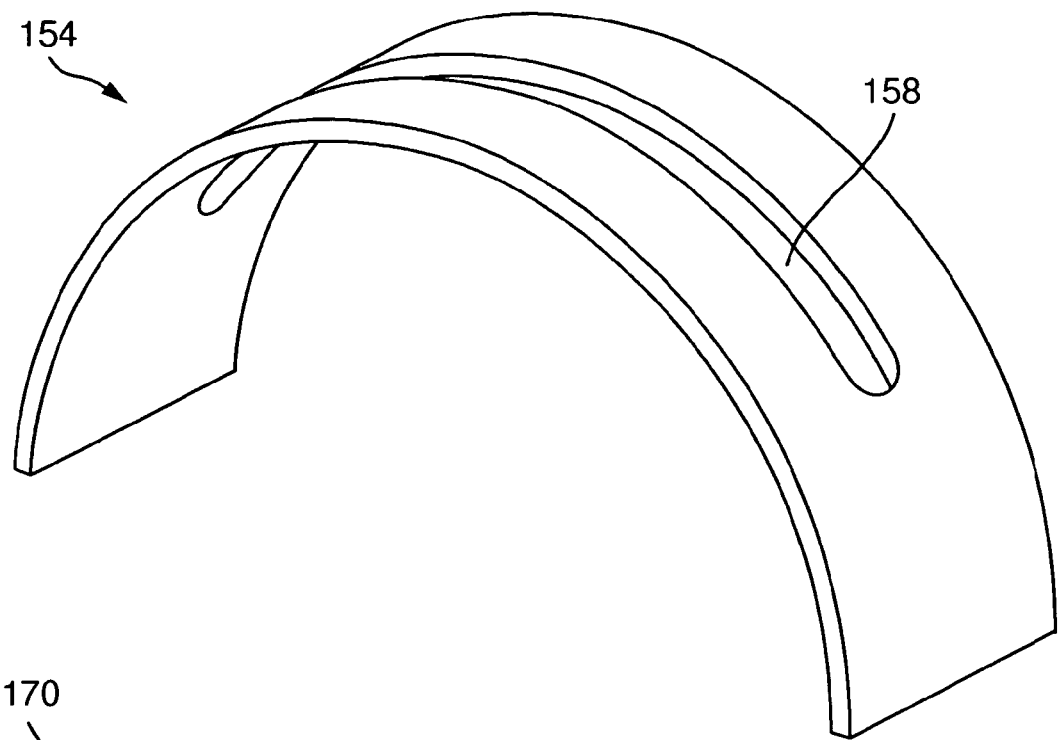
FIG. 1B shows a slotted bearing shell.
Figure 1C:
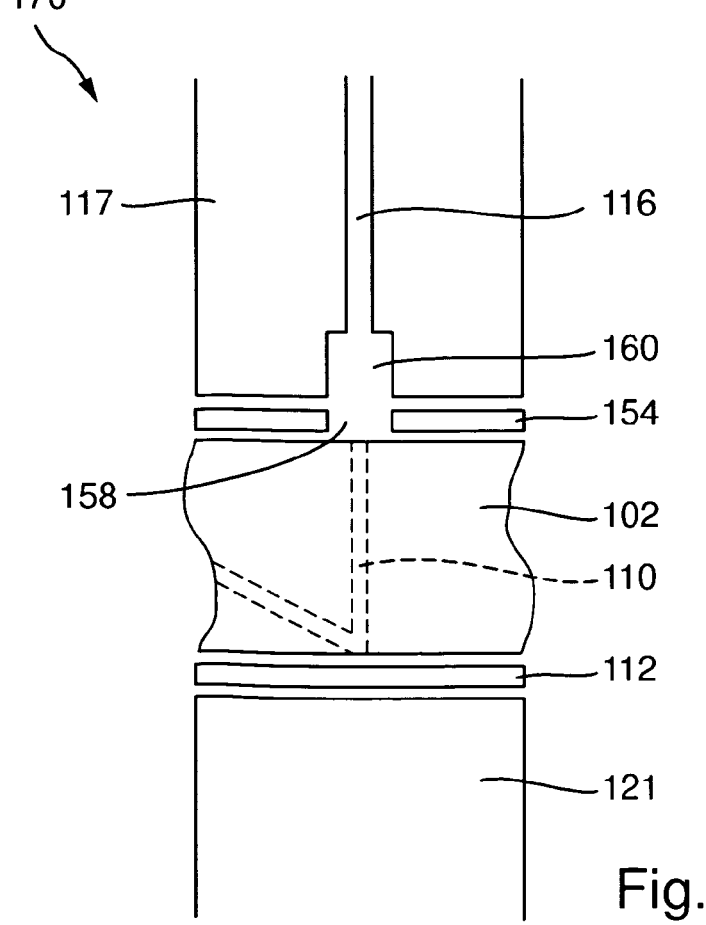
FIG. 1C shows a main bearing having an oil supply channel and a slotted bearing shell.

Referring now to FIGS. 1A, 1B and 1C of the drawings. FIG. 1A illustrates a crankshaft 100 according to a first embodiment of the present invention in side view. The crankshaft 100 has five main journal bearing sections 102A to 102E, four connector rod bearing sections 104A to 104D, web sections 106, crankshaft end portions 108A and 108B, and an oil feed passageway 110. Also shown are the corresponding plain bearing shells 112 and a slotted bearing shell 154 mounted in the bearing housing 117 (for clarity, only shown in correspondence with the slotted bearing shell) of the engine block and the bearing housing (not shown) of the cylinder head, and an oil supply passageway 116 within the engine block bearing housing. FIG. 1B illustrates a slotted bearing shell 154. FIG. 1C illustrates the part of FIG. 1A having the slotted bearing shell 154.

The crankshaft 100 is suited for use within a four cylinder engine, with four connector rods (not shown) being coupled about the four connector rod bearing sections 104A to 104D. The main journal bearing sections 102A to 102E are held within the bearing shells 112 and 154 of the engine block and cylinder head.

It will be understood that other arrangements with different numbers of main journal and connector rod bearings are possible within the scope of the present invention. For example, an engine in which six cylinders are served by a common crankshaft may have six connector rod bearings and seven main journal bearings.

The plain bearing shells 112 are hollow and substantially semi-cylindrical such that their inner surfaces mate with the bearing surfaces of the main journal bearing sections 102A to 102E.

The slotted bearing shell 154 differs from a plain bearing shell 112 by the inclusion of a slot 158. FIG. 1B shows a slotted bearing shell 154, which is hollow and substantially semi-cylindrical such that their inner surfaces mate with the bearing surfaces of a main journal bearing sections. The slotted bearing shell 154 has a semi-cylindrical slot 158, which communicates with the oil supply passageway 116 of the bearing housing 117 in the engine block. Oil supplied through the oil supply passageway 116 is received into a composite chamber formed between the bearing housing, the slot and the surface of a main journal bearing section of the crankshaft, i.e. being formed by the oil supply channel 160 and the slot 158.

In a car engine, the diameter of the main journal bearing sections 102A to 102E may be about 50 to 70 mm. The bearing shell 112 has an axial length of about 16 to 25 mm, and a maximal radial thickness of about 2.0 to 4.0 mm (modern engines bearing shells have a thickness of about 2.0 to 2.5 mm). The slotted bearing shell 154 is similarly sized to the plain bearing shell 112, with the slot 158 passing through the complete radial extend of the bearing shell. The slot 158 may be about 2 to 5 mm in width (axial dimension), and may extend around between about 50 to 90% of the circumferential extent of the slotted bearing shell 154.

The oil feed passageway 110 has a series of interconnecting bores formed in the different sections 102, 104 and 106 of the crankshaft 100. The oil feed passageway 110 has an inlet 122 and nine outlets 124. The inlet 122 and outlets 124 are distributed serially along the oil feed passageway 110. In the case that the crankshaft is formed by assembly of separate sections, the bores may conveniently be straight and bored into the sections before assembly.

In use, the oil enters the inlet 122 at a pressure sufficient to force the oil along the oil feed passageway 110 and out through the outlets 124.

Optionally the crankshaft 100 has a direction of rotation in use, and the inlet 122 is shaped to enhance the drawing of oil into the oil feed passageway 110 from the chamber within the slot 158 and oil supply channel 160, and/or the outlets 124 are shaped to enhance the drawing oil out of the oil feed passageway 110 into the bearing gaps between the crankshaft 100 and the plain bearing shells 112 to lubricate the respective bearings.

Although in FIG. 1A two of an inlet 122 or outlet 124 are provided in each of the main journal bearing sections 102A to 102E, it will be appreciated that alternative numbers of inlets or outlets may be provided in each main journal bearing section. For example, the crankshaft may be arranged such that only a single inlet of the oil feed passageway is provided, being in a first main journal bearing section, and a single outlet of the oil feed passageway is provided in each of the other main journal bearing sections.

In FIG. 1A the inlet 122 is provided centrally to the oil feed passageway 110, at the central main journal bearing 102C. This arrangement has the added advantage that it minimises the maximum distance from a single inlet to the furthest outlet of the oil feed passageway 110. In an alternative embodiment, the inlet may be provided at a different main journal bearing, e.g. 102A or 102E, at one end of the oil feed passageway 110. In the case of a crankshaft with an even number of main bearing sections (e.g. an engine with an odd number of cylinders), the inlet may be provided in a bearing surface of the central pair of main journal bearing sections.

Although the oil supply passageway 116 of FIG. 1A is within the engine block, it will be appreciated that it is within the scope of the present invention for the oil supply passageway to be provided within the bearing cap and/or oil tray of the engine.

As shown in the bearing arrangement 170 of FIG. 1C (a cross-sectional view coplanar with the axis of rotation of the main journal bearing section 102), in addition to the slotted bearing shell 154, the engine is provided with an oil supply channel 160 in the bearing housing 117. The oil supply channel 160 comprises a channel in the face of the bearing housing, which when viewed axially describes a space that is generally shaped like a portion of an annulus. However, it will be appreciated that in alternative bearing arrangements (not illustrated), the slotted bearing shell 154 may be used without a corresponding oil supply channel.

Figure 1D:
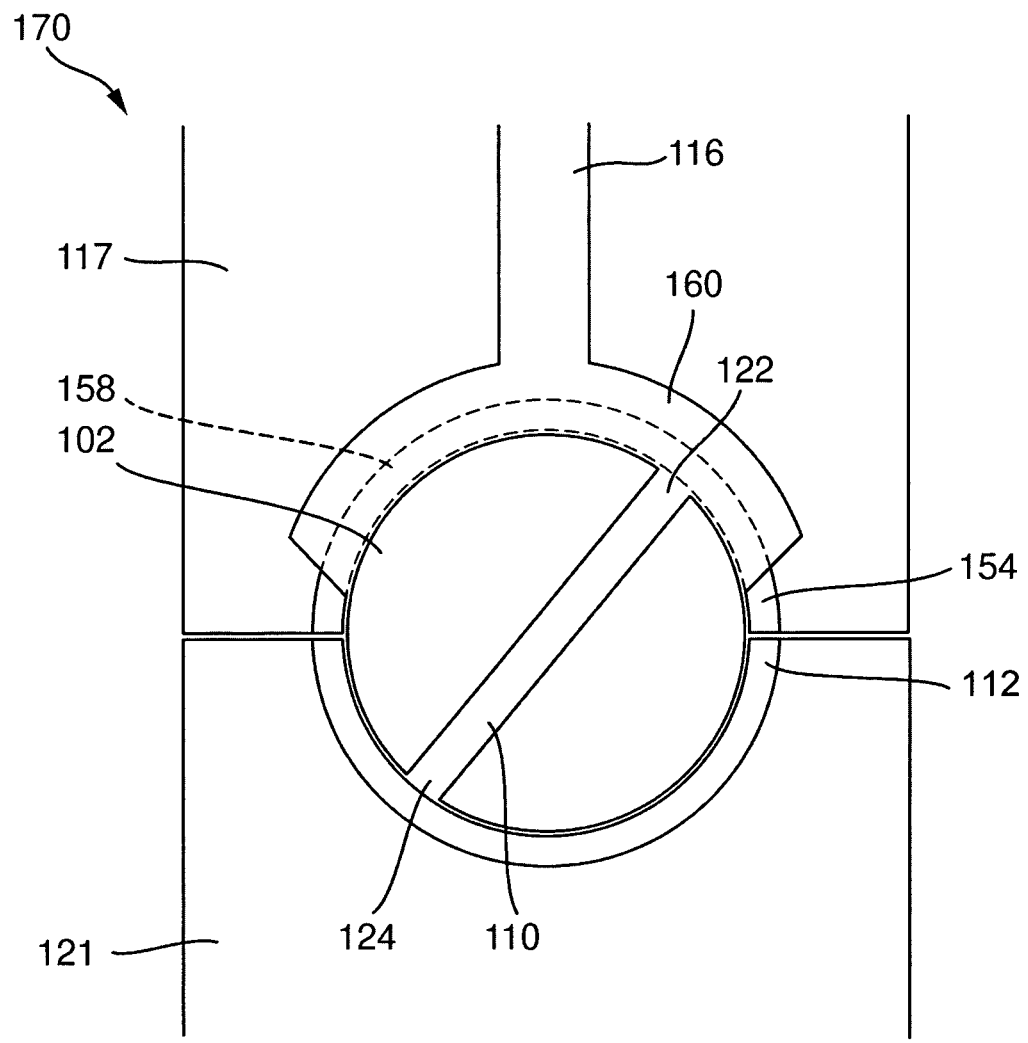
FIG. 1D shows a side view of the main bearing of FIG. 1D.

FIG. 1D shows a cross-sectional view (perpendicular to the axis of rotation of the main journal bearing section 102) of the bearing arrangement 170 of FIG. 1C. Advantageously, the oil supply channel 160 may provide enhanced oil distribution with respect to a grooved bearing shell, whilst also being convenient to manufacture, and without increasing the volume of oil entrained by the lubrication system by a significant extent.

The oil supply channel 160 may be provided in one or both of the engine block bearing housing 117 and the cylinder head bearing housing 121. The oil supply passageway 116 may be provided in one or both of the bearing housings 117 and 121.

The oil supply channel 160 illustrated in FIG. 1C is parallel sided, and the same width (axial extent) as the slot 158 in the slotted bearing shell 154. Alternatively the oil supply channel may be of a different width to the slot of the slotted bearing shell, for example being wider than the slot, providing a greater cross-sectional area for the distribution of oil through the oil supply channel. In a further alternative, the oil supply channel may have a different cross-sectional shape, that is not parallel sided.

Figure 1E:
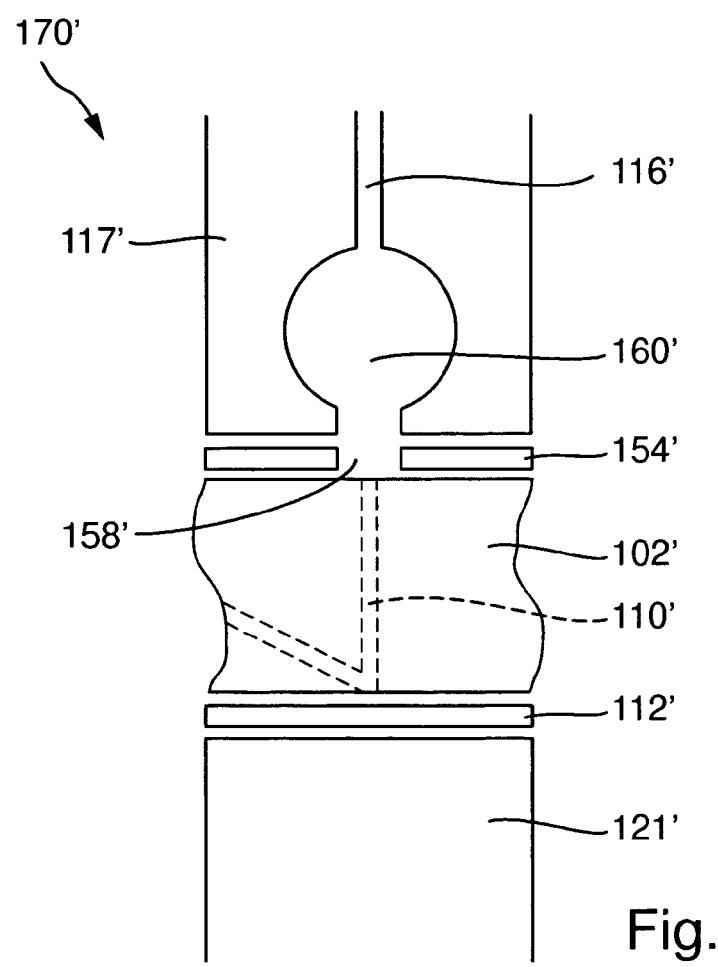
FIG. 1E shows a main bearing having a further oil supply channel and a slotted bearing shell.

FIG. 1E illustrates an alternative bearing arrangement 170', in which at least part of the oil supply channel 160' is wider than the width of the oil supply slot 158'. Such designs further increase the cross-sectional area available for the supply of oil to the bearing and the oil feed passageway 110', and additionally or alternatively enables a reduction in the width of the oil supply slot 158 in the bearing shell 154.

Figure 2A:
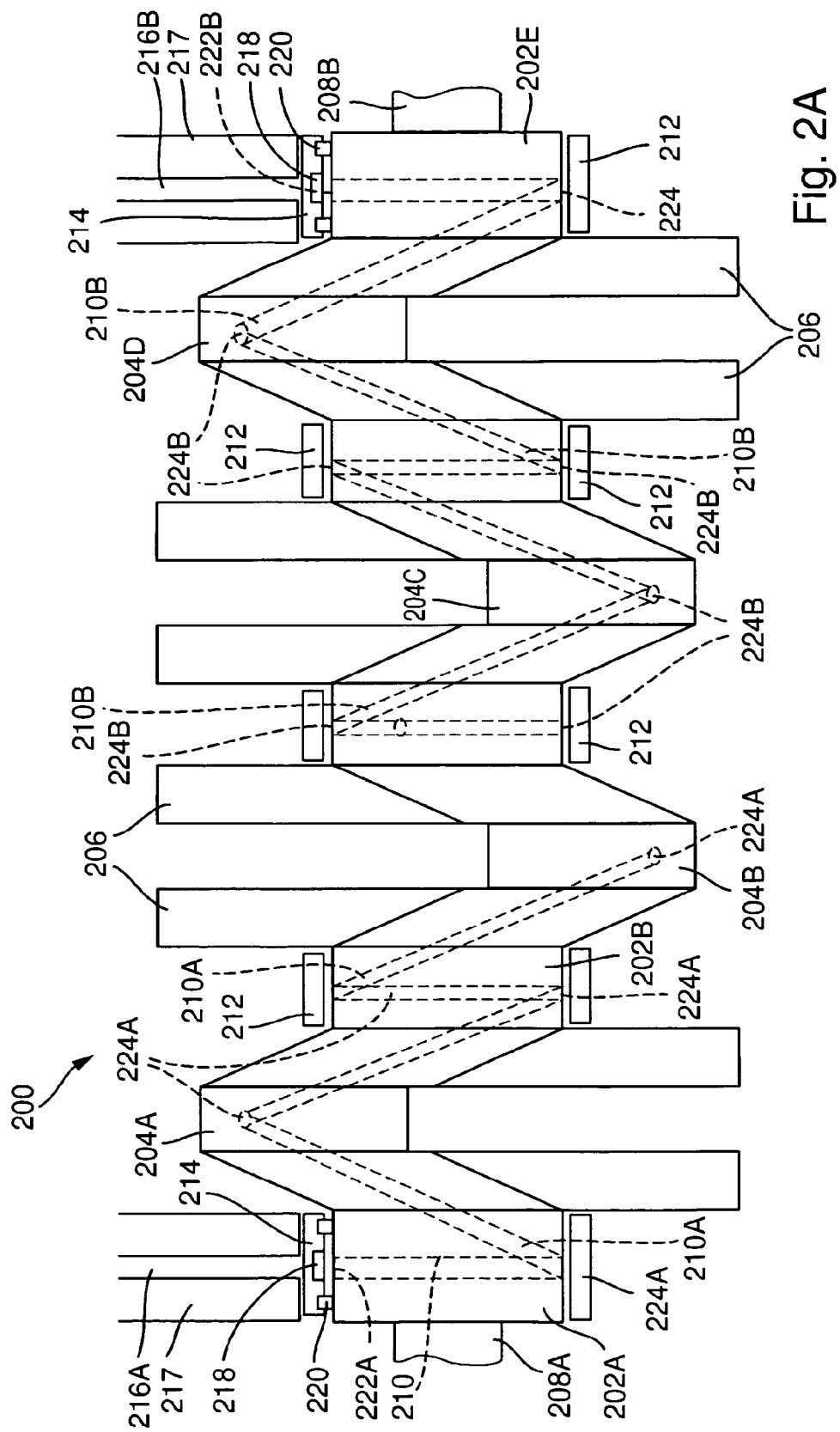
FIG. 2A shows a further crankshaft according to the present invention.

Referring now to FIG. 2A of the drawings, a second embodiment of a crankshaft 200 according to the present invention is shown in side view. In this embodiment, the crankshaft 200 is similar to the crankshaft 100 of the first embodiment in FIG. 1A, and like features have been identified with like numerals, incremented by 100. Accordingly, the connector rod bearing sections 204A to 204D of FIG. 2A correspond with the connector rod bearing sections 104A to 104D of FIG. 1A.

The crankshaft 200 has two oil feed passageways 210A and 210B, which do not communicate with each other. The oil feed passageways 210A and 210B have respective inlets 222A and 222B in the bearing surfaces of the end main journal bearing sections 202A and 202E. The inlets 222A and 222B communicate with respective pluralities of outlets 224A and 224B.

In contrast to the slotted bearing shells 154 of FIG. 1A, the bearing arrangement of FIG. 2A is provided with grooved bearing shells 214, which differ from the plain bearing shells 212 by the provision of a semi-circular groove 218, a supply hole (not shown) communicating between the groove 218 and the oil supply passageways 216A and 216B of the bearing housing 217 in the engine block, and semi-cylindrical seals 220, such that oil supplied through the oil supply passageway is received into a chamber formed between the groove 218 and the surface of the respective main journal bearing surface 202A and 202E.

In use, lubricating oil is supplied to oil supply passageways 216A and 216B, and thence the oil is supplied to the grooves 218 of grooved bearing shells 214. The inlets 222A and 222B of the rotating crankshaft 200 draw in oil to the oil feed passageways 210A and 210B under sufficient pressure to feed oil to the respective outlets 224A and 224B, and thereby to lubricate the main journal bearings.

Figure 2B:
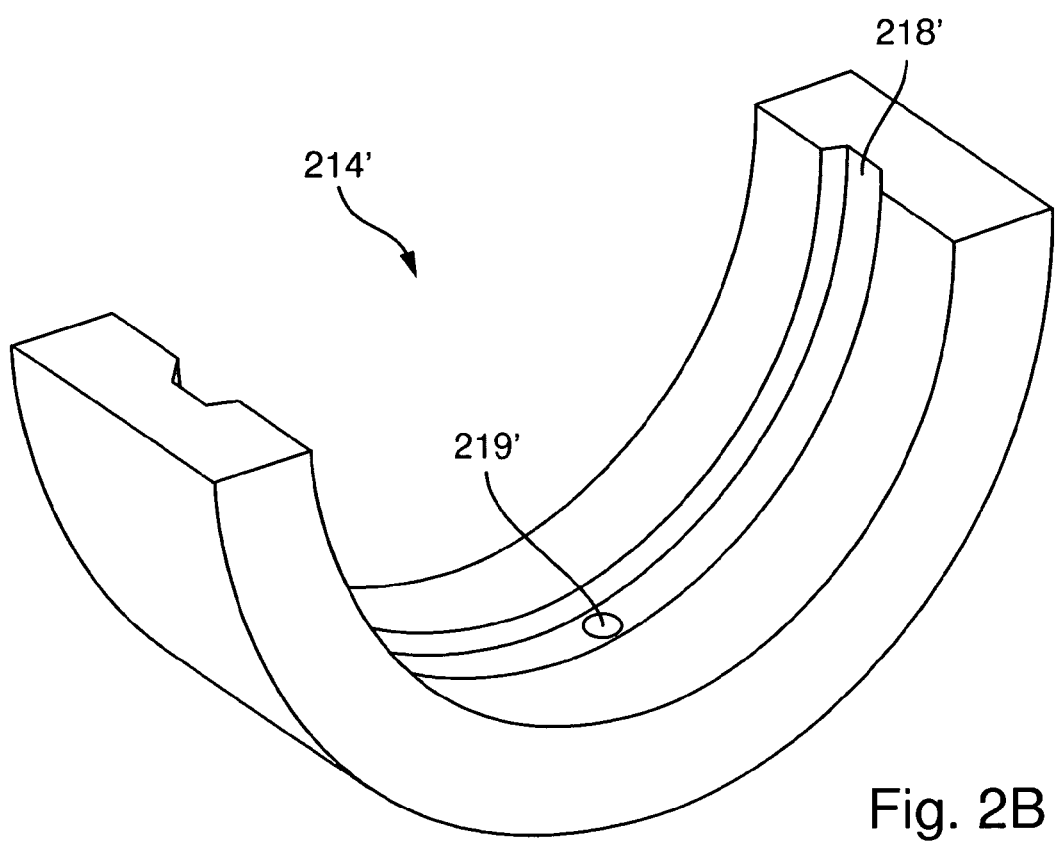
FIG. 2B shows grooved bearing shell.

FIG. 2B shows an alternative design of grooved bearing shell 214'. This differs from the plain bearing shell 212 by the provision of a circumferential, semi-cylindrical groove 218', a supply hole 219' communicating between the groove 218' and the oil supply passageway 216 of the engine block. In contrast to the grooved bearing shells 214 of FIG. 2A, the grooved bearing shell 214' of FIG. 1B is not provided with semi-cylindrical seals 220. Further, the groove 218' is a trapezoid in cross-section, and may be rounded between the surfaces of the groove. Oil supplied through the oil supply passageway 216 is received into a chamber formed between the groove and the surface of a main journal bearing section. The groove 218' is about 2 to 5 mm wide (axial dimension), with a radial depth of about 1 to 1.5 mm.

Although in FIG. 2 two inlets 222A and 222B are provided, with one inlet to each of two separate oil feed passageways 210A and 210B, in an alternative embodiment, two inlets may be provided to a single oil feed passageway.

Two (or more) inlets may be provided to a common oil feed passageway. Advantageously, this can provide a more uniform oil pressure at the outlets and/or provide enhanced oil pressure at the outlets.

The oil feed passageways 110, 210A and 210B are shown in FIGS. 1A, 1C, 1D, 1E and 2A as having a series of serially arranged sections, each of which sections is terminated at a bearing surface. Alternatively, the oil feed passageway may comprise a stem passageway from which branches radiate to bearing surfaces (not illustrated).

The present invention also encompasses both an engine (not shown) and a vehicle (not shown) having a crankshaft according to one of the embodiments of the invention.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A crankshaft arrangement comprising:
   a crankshaft comprising:
      a plurality of main journal bearing surfaces,
      a plurality of connector rod bearing surfaces, and
      at least one oil feed passageway internal to the crankshaft, each of the at least one oil feed passageways communicating with an inlet and a plurality of outlets located within bearing surfaces,
      wherein the inlet is located within a first main journal bearing surface, and at least one of the outlets is located within a second main journal bearing surface; and
   a plurality of bearing shells disposed corresponding to the main journal bearing surfaces and at a gap from each of the main journal bearing surfaces, wherein each bearing shell corresponding to the main journal bearing surface having the inlet has an oil supply slot, wherein an oil supply channel is provided in a bearing housing that houses each bearing shell having the oil supply slot, wherein the at least one outlet in the second main journal bearing surface is arranged such that oil exiting said at least one outlet enters the gap, and wherein the at least one oil feed passageway is configured to supply oil to an outlet in a first, connector rod bearing surface that is connected to the oil feed passageway intermediate the input in the first main journal bearing surface and the at least one output in the second main journal bearing surface.

2. The crankshaft arrangement according to claim 1, wherein the each inlet is located within a main journal bearing surface proximal an end of the crankshaft.

3. The crankshaft arrangement according to claim 1, wherein each inlet is located within a main journal bearing surface substantially centrally located within the plurality of main journal surfaces.

4. The crankshaft arrangement according to claim 1, wherein the at least one oil feed passageway comprises a first inlet and a second inlet each located within a main journal bearing surface.

5. The crankshaft arrangement according to claim 4, wherein the first and second inlets are located in different main journal bearing surfaces.

6. The crankshaft arrangement according to claim 1, wherein the at least one oil feed passageway comprises a first inlet and a second inlet, and wherein the first inlet and second inlet communicate with a common oil feed passageway.

7. The crankshaft arrangement according to claim 1, wherein the crankshaft comprises a first oil feed passageway communicating with a first inlet, and a second oil feed passageway communicating with a second inlet, the first and second oil feed passageways being separate.

8. The crankshaft arrangement according to claim 1, wherein the plurality of outlets are located within a plurality of main journal surfaces.

9. The crankshaft arrangement according to claim 1, wherein the oil feed passageway is configured to supply oil to an outlet in a second, connector rod bearing surface that is connected to the oil feed passageway intermediate the output in the second main journal bearing surface and an output in a third main journal bearing surface.

10. The crankshaft arrangement according to claim 9, wherein the second main journal bearing surface is not provided with a direct external oil feed inlet.

11. The crankshaft arrangement according to claim 1, wherein the oil feed passageway comprises a series of serially arranged sections, each of which sections is terminated at a bearing surface.

12. The crankshaft arrangement according to claim 1, wherein the oil feed passageway comprises a stem passageway from which one or more branches communicate to bearing surfaces.

13. The crankshaft arrangement according to claim 1, wherein at least part of the oil supply channel is wider than the oil supply slot in the bearing shell.

14. The crankshaft arrangement according to claim 1, comprising a plurality of bearing housings and an oil supply passageway communicating with the inlet is provided within at least one of the bearing housings.

15. The crankshaft arrangement according to claim 14, wherein an oil supply passageway is provided in correspondence with the or each inlet of the crankshaft.

16. The crankshaft arrangement according to claim 1, wherein an oil supply passageway is not provided in correspondence with at least two of the main journal bearings.

17. An engine comprising crankshaft arrangement according to claim 1.

18. A vehicle comprising an engine according to claim 17.

* * * * *